United States Patent
Devale et al.

(10) Patent No.: US 10,372,295 B2
(45) Date of Patent: *Aug. 6, 2019

(54) MANAGING SERVICEABILITY MODES

(71) Applicant: International Business Machines Corporation, Armonk, NY (US)

(72) Inventors: Santosh Devale, Davangere (IN); Vishal Kulkarni, Bangalore (IN); Venkatesh Sainath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 730 days.

This patent is subject to a terminal disclaimer.

(21) Appl. No.: 15/043,652

(22) Filed: Feb. 15, 2016

(65) Prior Publication Data

US 2016/0162134 A1    Jun. 9, 2016

Related U.S. Application Data

(63) Continuation of application No. 14/311,493, filed on Jun. 23, 2014, now Pat. No. 9,330,543.

(51) Int. Cl.
*G09F 9/33* (2006.01)
*G06F 3/0482* (2013.01)
(Continued)

(52) U.S. Cl.
CPC ......... *G06F 3/0482* (2013.01); *G06Q 10/063* (2013.01); *G08B 5/36* (2013.01)

(58) Field of Classification Search
CPC .............. G06F 3/0482; G06F 11/1072; G06F 13/1673; G06F 2201/81; G06F 3/0632;
(Continued)

(56) References Cited

U.S. PATENT DOCUMENTS 4,567,785 A * 2/1986 Reynolds ................ F16H 61/24
74/473.24
6,867,701 B2    3/2005 Lawrence et al.
(Continued)

FOREIGN PATENT DOCUMENTS

JP    2012238116 A    12/2012
KR    101120057 B1    3/2012

OTHER PUBLICATIONS

Appendix P.: List of IBM Patents or Patent Applications Treated as Related, Dated Feb. 15, 2016, 2 pages.
(Continued)

*Primary Examiner* — Daniel Previl
(74) *Attorney, Agent, or Firm* — Tihon Poltavets

(57) ABSTRACT

A computer-implemented method, carried out by one or more processors, for managing serviceability modes in a data center. In an embodiment, the method comprises the steps of receiving a serviceability mode selection for a component in a data center, wherein the serviceability mode correlates to information presented by one or more components in the data center; assigning a scheme for one or more LEDs on the component based, at least in part, on the received serviceability mode selection; and determining to activate the one or more LEDs on the component based at least on the assigned scheme.

18 Claims, 4 Drawing Sheets

(51) Int. Cl.
*G08B 5/36* (2006.01)
*G06Q 10/06* (2012.01)

(58) Field of Classification Search
CPC .... G06F 12/00; G06F 12/0238; G06F 13/362; G06F 15/78; G06F 3/04897; G06F 3/0607; G06F 3/0619; G06F 3/0631; G06F 3/0653; G06F 3/0679; G06F 3/0683; G06F 9/4818; G06Q 10/063; G08B 5/36; G11C 29/02; G11C 29/50; G11C 29/52; G11C 14/0018; Y02D 10/14; F04C 2/344; F16H 61/24; F16H 63/20; F16H 63/3408; Y02B 60/1228; Y10T 74/20104
USPC ... 340/815.45, 384.71, 384.5, 815.48, 425.2, 340/815.65, 815.69
See application file for complete search history.

(56) References Cited

U.S. PATENT DOCUMENTS

| | | | |
|---|---|---|---|
| 7,434,071 B2 | 10/2008 | Huang et al. | |
| 8,121,873 B1 | 2/2012 | Wolff et al. | |
| 8,223,015 B2 | 7/2012 | Yuuki | |
| 9,330,543 B2* | 5/2016 | Devale | G08B 5/36 |
| 2005/0283348 A1 | 12/2005 | Tsui et al. | |
| 2008/0037051 A1* | 2/2008 | Otsubo | G06F 3/04897 |
| | | | 358/1.14 |
| 2008/0310850 A1 | 12/2008 | Pederson et al. | |
| 2011/0239056 A1 | 9/2011 | Adams | |
| 2012/0260137 A1* | 10/2012 | Berke | G06F 13/1673 |
| | | | 714/721 |
| 2015/0371508 A1 | 12/2015 | Santosh et al. | |

OTHER PUBLICATIONS

Nagura, T., et al. "Tracking an LED Array Transmitter for Visible Light Communications in the Driving Situation". ISWCS 2010. pp. 765-769.

"Arduino-AnalogInOutSerial". [online][retrieved on: Jan. 20, 2014]. Created on Dec. 29, 2008. Modified on: Apr. 9, 2012.

"Compaq.com—Compaq ProLiant 6400R—Product Description". Jan. 20, 2014. <http://h18000.www1.hp.com/products/servers/proliant6400r/description.html>.

"Method and System for Providing Light Emitting Diodes (LEDs) to Blade Servers". IP.com No. IPCOM000208520D. IP.com Electronic Publication: Jul. 11, 2011.

Method to enhance serviceability of blade servers in a data center by assisting the user in identification of Blade servers. IP.com No. IPCOM000228627D. IP.com Electronic Publication: Jun. 25, 2013.

"Object hyperlinking—Wikipedia, the free encyclopedia". Jan. 24, 2013.

"[SysMgt] Method and process for server identification using light patterns". IP.com No. IPCOM000198318D. IP.com Electronic Publication: Aug. 4, 2010.

"VisualMIMO webpage". Visual MIMO Camera based Optical Wireless. [online] [retrieved on: Jan. 20, 2014]. <http://www.winlab.rutgers.edu/~visulamimo/Home.html>.

* cited by examiner

MANAGING SERVICEABILITY MODES

BACKGROUND

A typical data center can contain a variety of systems from multiple vendors where, for each vendor, there can be several models of systems. The variety of systems within the data center is typically managed by one or more management consoles. Typically systems within the data center are grouped together, however, it is not necessary for each system to be physically located next to the other systems. So, if a user is servicing a particular group of systems in the data center, the user has to find where the systems for that particular group are located. Each system usually has associated components, where the other components assist in day to day operations of each system. Such components include switches, storage devices, power supplies, and cooling modules. Each of the components of each system typically have operating information that a user who is servicing the system may want to review.

Each system can have multiple LEDs emitting status of the system and of the associated components. The user servicing the data center can turn on a particular system's LEDs from the management console to help locate the system in the data center. In a data center, the user servicing the systems may encounter a large number of LEDs emitting status information, where the user servicing the data center may have to access the management console for the particular service action multiple times. It is also common for the user servicing the particular system to utilize multiple management consoles.

SUMMARY

Embodiments of the present invention disclose a method, computer program product and computer system for managing serviceability modes in a data center. A computer-implemented method, carried out by one or more processors, for managing serviceability modes in a data center comprises the steps of receiving, by one or more processors, a serviceability mode selection for a component in a data center, wherein the serviceability mode correlates to information presented by one or more components in the data center; assigning, by one or more processors, a scheme for one or more LEDs on the component based, at least in part, on the received serviceability mode selection; and determining, by one or more processors, to activate the one or more LEDs on the component based at least on the assigned scheme.

DETAILED DESCRIPTION

Embodiments in accordance with the present invention manage serviceability modes in a data center, where the data center can include one or more servers. Embodiments in accordance with the present invention receive a serviceability mode selection for a component (e.g., a server) in a data center, wherein the serviceability mode correlates to information presented by one or more components in the data center. A user within the data center can select the serviceability mode through a management console for the component. Embodiments in accordance with the present invention assign a scheme for one or more LEDs on the component based, at least in part, on the received serviceability mode selection and determine to activate the one or more LEDs on the component based at least on the assigned scheme.

Figure 1:
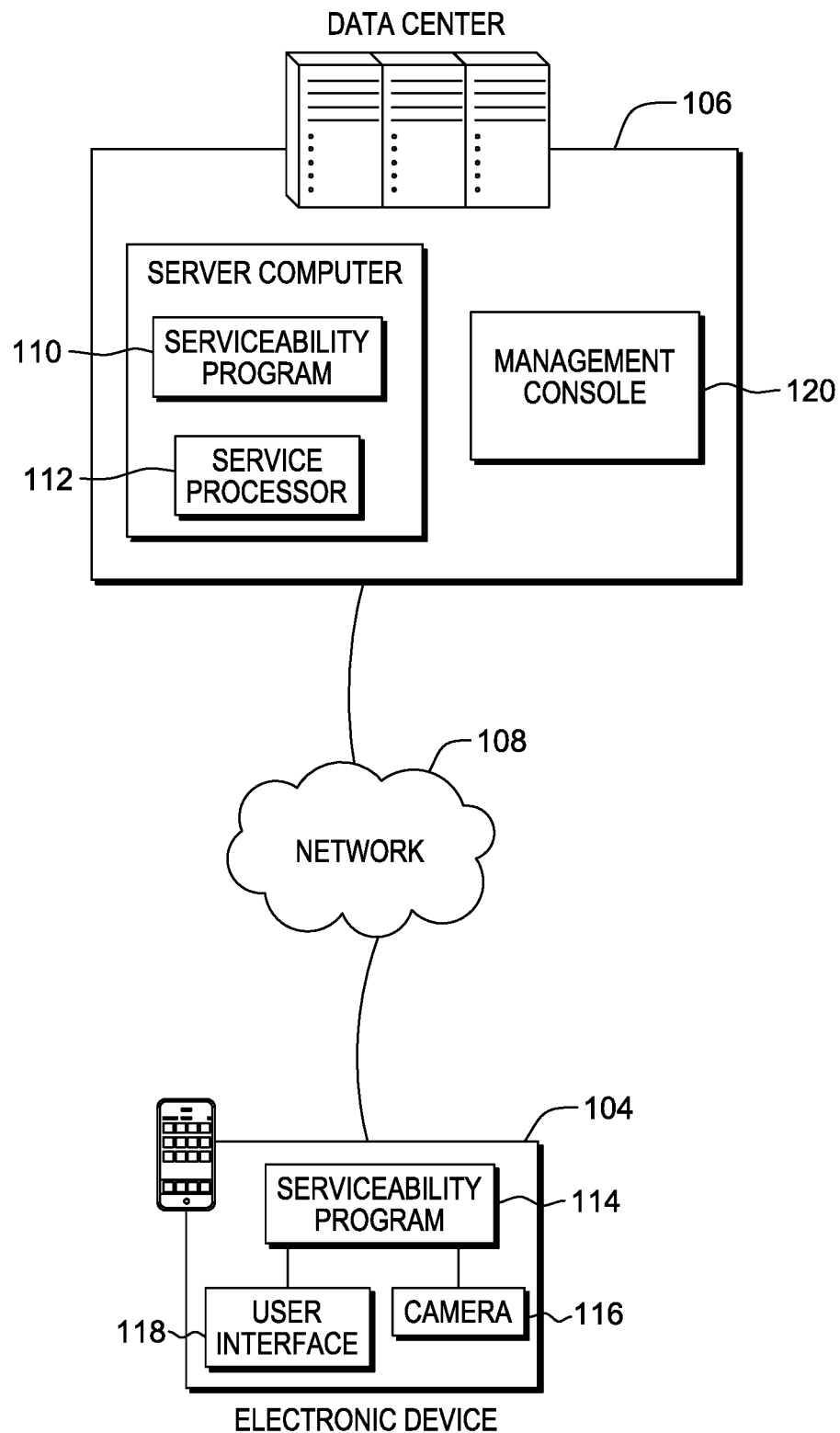
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102, electronic device 104, and data center 106 interconnected over network 108.

Server computer 102 may be a desktop computer, a laptop computer, a tablet computer, a specialized computer server, a smartphone, or any other computer system known in the art. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information.

Serviceability program 110 residing in server computer 102 has the ability to receive serviceability mode selections from a user of electronic device 104 or from management console 120. Alternatively, in another embodiment, management console 120 has the ability to receive serviceability mode selections from a user of management console 120 or from a user of electronic device 104. Management console 120 can send the serviceability mode selection to a select server, group of servers, or other components located in data center 106. In another embodiment, serviceability program 110 residing in server computer 102, can send the serviceability mode selection to a select server, a group of servers, or other components located in data center 106 using the network 108. The serviceability mode dictates the information each server within data center 106 emits through light-emitting diodes (LEDs). Serviceability program 114 has the ability to receive a video stream of servers in the data center of the emitting LEDs utilizing camera 116, and identify information within the video stream of the emitting LEDs. Serviceability program 114 can display the identified information to the user in user interface 118 of electronic device 104.

Electronic device 104 may be a laptop computer, a tablet computer, a netbook computer, a personal digital assistant (PDA), a smartphone, or any other electronic device capable of communicating with server computer 102 and data center 106 via network 108. Electronic device 104 has the ability to display information to a user through user interface (UI) 118 and capture a video from a camera tool, such as camera 116. Camera 116 residing in electronic device 104 has the ability to capture sequential still images and videos.

In general, network 108 can be any combination of connections and protocols that will support communications between electronic device 104 and data center 106, more specifically, management console 120 and server computer 102. Network 108 can include, for example, a local area network (LAN), a wide area network (WAN) such as the internet, a cellular network, or any combination of the preceding, and can further include wired, wireless, and/or fiber optic connections. In one embodiment, serviceability program 110 can be a web service accessible via network 108 to a user of a separate device. In another embodiment, serviceability program 110 may be operated directly by a user of server computer 102 through management console 120.

Data center 106 may be a collection of systems such as servers, along with operating components such as switches, storage devices, power supplies, and cooling modules. Each system within data center 106 has one or more LEDs capable of relaying information through variations of each emitting LED. The information the LEDs relay is based on a serviceability mode set on serviceability program 110.

User interface 118 on electronic device 104 displays information that any one of the processes of serviceability program 110 or serviceability program 114 may display to a user. User interface 118 can be, for example, a graphical user interface (GUI) or a web user interface (WUI) that displays text, documents, web browser windows, user options, application interfaces and instructions for operation. User interface 118 also has the ability to receive user inputs for both serviceability program 110 and serviceability program 114.

Management console 120 residing in data center 106 can manage one or more servers and one or more components, such as switches and routers, of data center 106. Serviceability program 110 is capable of receiving a serviceability mode selection from management console 120 through an isolated network within the data center not illustrated in FIG. 1. Server computer 102 residing in data center 106 is also connected to the management console and the other servers and components through the isolated network. Service processor 112 allows for management console 120 to manage server computer 102 by receiving and processing a serviceability mode selection for serviceability program 110.

Figure 2:
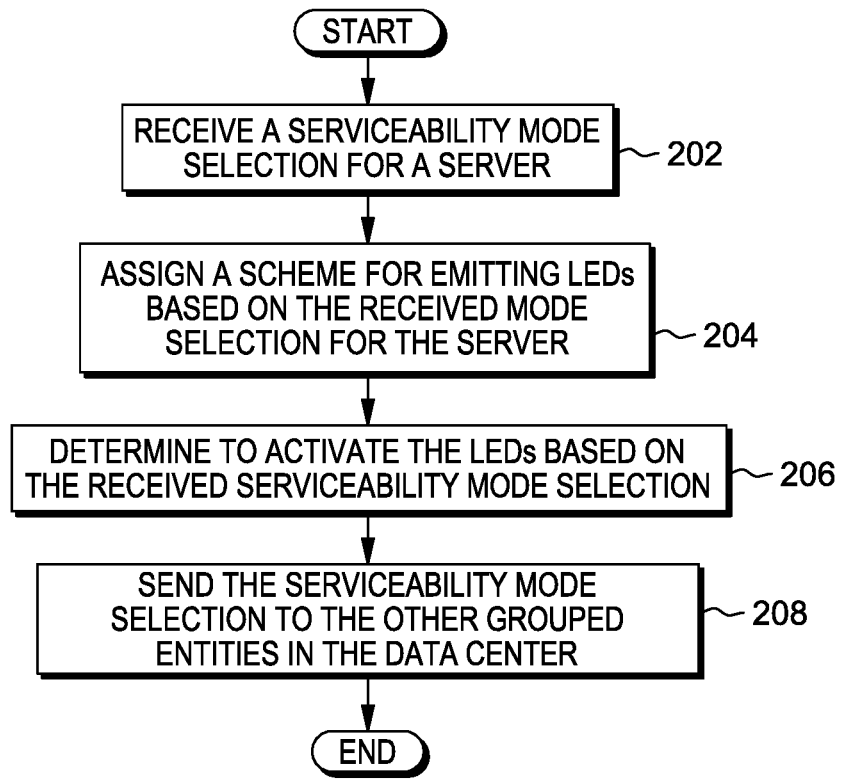
FIG. 2 is a flowchart depicting operational steps of a serviceability program for managing information associated with multiple serviceability modes, in accordance with an embodiment of the present invention.

FIG. 2 is a flowchart depicting operational steps of a serviceability program for managing information associated with multiple serviceability modes, in accordance with an embodiment of the present invention.

Serviceability program 110 receives a serviceability mode selection for a server (step 202). In this embodiment, a user is servicing the data center and selects a serviceability mode through user interface 118 on electronic device 104. The data center contains groups of systems, where each group of systems in the data center is managed as a single entity. Serviceability program 110 assigns a scheme for the emitting LEDs based on the received serviceability mode selection for the server (step 204). An example serviceability mode is identify and locate mode, where serviceability program 110 can assign a particular pattern (i.e., scheme) for the emitting LEDs based on the selected identify and locate mode, and send the selected serviceability mode to other connected components that have been grouped into a single entity in the data center. Serviceability program 110 sends the selected serviceability mode to other connected components that are grouped in a single entity in the data center. The particular emitted patterns by the LEDs of each system in a data center allows for the user servicing a particular group in a data center to identify the particular systems within the particular group.

Another example serviceability mode is repair and verify mode. Repair and verity mode allows for systems in the data center to transmit information, through the emitting LEDs, on how to repair and verify a particular system or specific components of the particular system in either concurrent or disruptive modes in the data center. In one embodiment, the information being transmitted allows for serviceability program 110 to identify repair and verify procedures, which the user servicing the data center can follow to resolve an issue in a particular system. Repair and verify mode also allows for a particular system to transmit information.

Another example serviceability mode is environment monitor mode, where the system can transmit a serial number of a particular system through the emitting LEDs so that a user servicing the particular system can log an environmental report. The environmental report can include an operating noise level for the particular system, ambient temperatures in the data center, exhaust temperatures from the cooling modules, and a measure of vibrations the system is experiencing. The environment report can then include a time stamp for when the log was created for the particular system and the serial number which was transmitted through the emitting LEDs.

Management tool mode is another example of a serviceability mode selection which serviceability program 110 can receive. Management tool mode enables a particular system to transmit information through the emitting LEDs, such that serviceability program 114 can display a system management page of a management tool in user interface 118 of electronic device 104 of the user servicing the data center. In one embodiment, the emitting LEDs can contain information of an IP address, where the IP address corresponds to management console 120 managing server computer 102. In another embodiment, the emitting LEDs can contain information to a slot number of the particular system, where the slot number can be utilized to identify a system management page of a management tool. If the particular system is managed by two or more management tools, the particular system can transmit the information identifying the management page for servicing the latest serviceable event.

Serviceability program 110 determines to activate the LEDs based on the received serviceability mode selection (step 206). In this embodiment, based on the serviceability mode selection received in step 202, serviceability program 110 determines to activate LEDs for each of the grouped components in the data center. Serviceability program 110 can receive another selection, subsequent to receiving the serviceability mode selection, to active the LEDs for each of the grouped components in the data center. A service processor located in each of the components in the data center is capable of controlling the LEDs for that particular component in the data center. The service processor 112 allows for each component to be remotely managed, for example, by a management console 120 located in the data center.

Serviceability program 110 sends the serviceability mode selection to the other grouped entities in the data center (step 208). In this embodiment, the serviceability mode selected by the user of electronic device 104 in step 202 was management tool mode. Serviceability program 110 sends the management tool mode selection to each system in the group within the data center. In another embodiment, serviceability program 110 can prompt a message on user interface 118 of electronic device 104 requesting a selection of a group of systems in the data center to send the serviceability mode selection. Serviceability program 110 can receive a selection of one or more groups of systems to send the serviceability mode selection (i.e., management tool mode). Serviceability program 110 can send two or more serviceability mode selections to systems in the data center, where an order is assigned to the two or more serviceability mode selections. When a system receives the two or more serviceability mode selections, the system can transmit information through the emitting LEDs for each of the two or more serviceability mode selections according to the previously assigned order.

Figure 3:
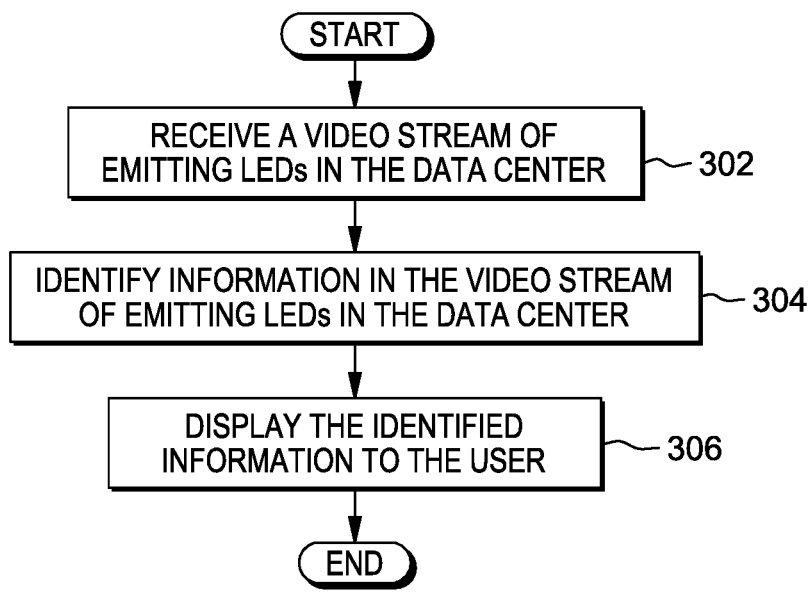
FIG. 3 is a flowchart depicting operational steps of a serviceability program for identifying information associated with a serviceability selection, in accordance with an embodiment of the present invention.

FIG. 3 is a flowchart depicting operational steps of a serviceability program for identifying information associated with a serviceability selection, in accordance with an embodiment of the present invention.

Serviceability program 114 receives a video stream of emitting LEDs in the data center (step 302). In this embodiment, a user of electronic device 104 is servicing a system in the data center in management tool mode. Utilizing electronic device 104, the user records a video of emitting LEDs of the system in the data center. The information being transmitted in the emitting LEDs of the system corresponds to an IP address for a management page of a management tool. In this example, there is a single management tool for the system being serviced. In another example, there can be two or more management tools, and the emitting LEDs can transmit the IP address to the management page of a management tool most relevant to the servicing being performed by the user of electronic device 104.

Serviceability program 114 identifies information in the video stream of emitting LEDs in the data center (step 304). Depending on the serviceability mode, serviceability program 114 identifies information in the video stream of emitting LEDs in the data center. In this embodiment, serviceability program 114 received a serviceability mode selection of management tool mode. Serviceability program 114 determines the video stream of emitting LEDs of a system contains information of an IP address to a management page of a management tool. Serviceability program 114 can identify the IP address emitted from the "on" and "off" blinking patterns of the LEDs. In another embodiment, serviceability program 114 received a serviceability mode selection of repair and verify mode. Serviceability program 114 determines the video stream of emitting LEDs of a system contains information on a repair and verify procedure animation for the system.

Serviceability program 114 displays the identified information to the user (step 306). In this embodiment, serviceability program 114 utilizes the identified IP address for the management tool mode for the system to connect to the management tool webpage and display the webpage to the user of electronic device 104. Depending on the identified information in the video stream of emitting LEDs in the data center, serviceability program 114 can display the information to the user through a user interface (e.g., user interface 118) of an electronic device (e.g., electronic device 104).

Figure 4A:
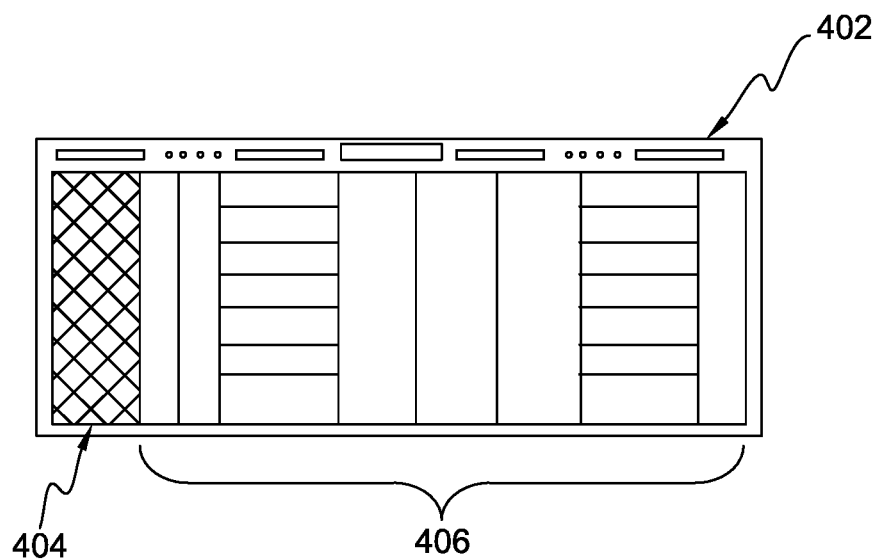
FIG. 4A illustrates an example server in a data center where a serviceability program is implemented, in accordance with one embodiment of the present invention.

FIG. 4A illustrates an example server in a data center where a serviceability program is implemented, in accordance with one embodiment of the present invention.

In this example, a user is servicing data center 402, which contains various servers, cooling modules, and storage devices. More specifically, the user is servicing server 404 in data center 402, where components 406 represent the other various servers, cooling modules, and storage devices. Serviceability program 110 receives a serviceability mode selection from the user servicing data center 402. In this example, the serviceability mode that the user servicing data center 402 selects is environment monitor mode. In environment monitor mode, server 404 transmits the ambient temperature, cooling parameters, corrosion sensor information, and any other environmental data through the emitting LEDs. Server 404 also transmits the serial number with which the environmental information is tagged.

Figure 4B:
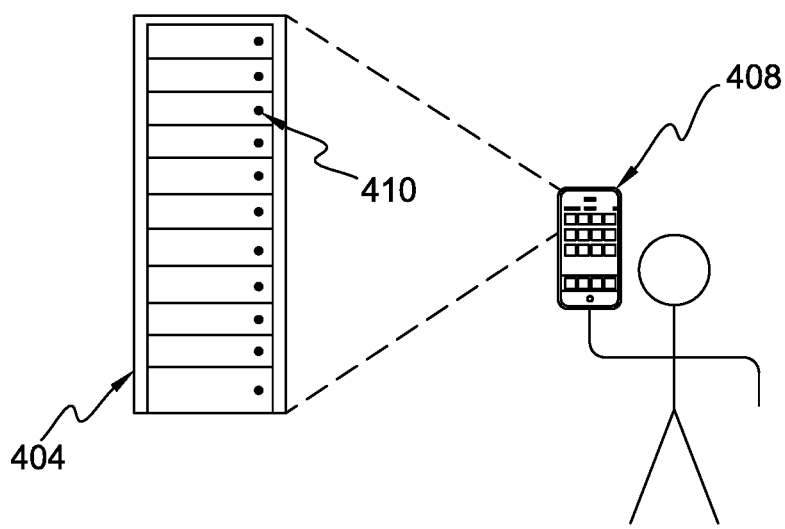
FIG. 4B illustrates an example of a server rack from the data center of FIG. 3A where a serviceability program is implemented, in accordance with one embodiment of the present invention.

FIG. 4B illustrates an example of a server rack from the data center of FIG. 4A where a serviceability program is implemented, in accordance with one embodiment of the present invention.

Continuing the example from FIG. 4A, server 404 contains various LEDs transmitting information. Utilizing electronic device 408, the user takes a video stream of LED 410 transmitting information. Serviceability program 114 receives the video stream, where serviceability program 114 identifies the information being transmitted through the emitting LED 410. Upon identifying the information, serviceability program 114 displays the information on a user interface of electronic device 408. In this example, the information electronic device 408 displays is the serial number for server 404 along with the environmental data received from server 404.

Figure 5:
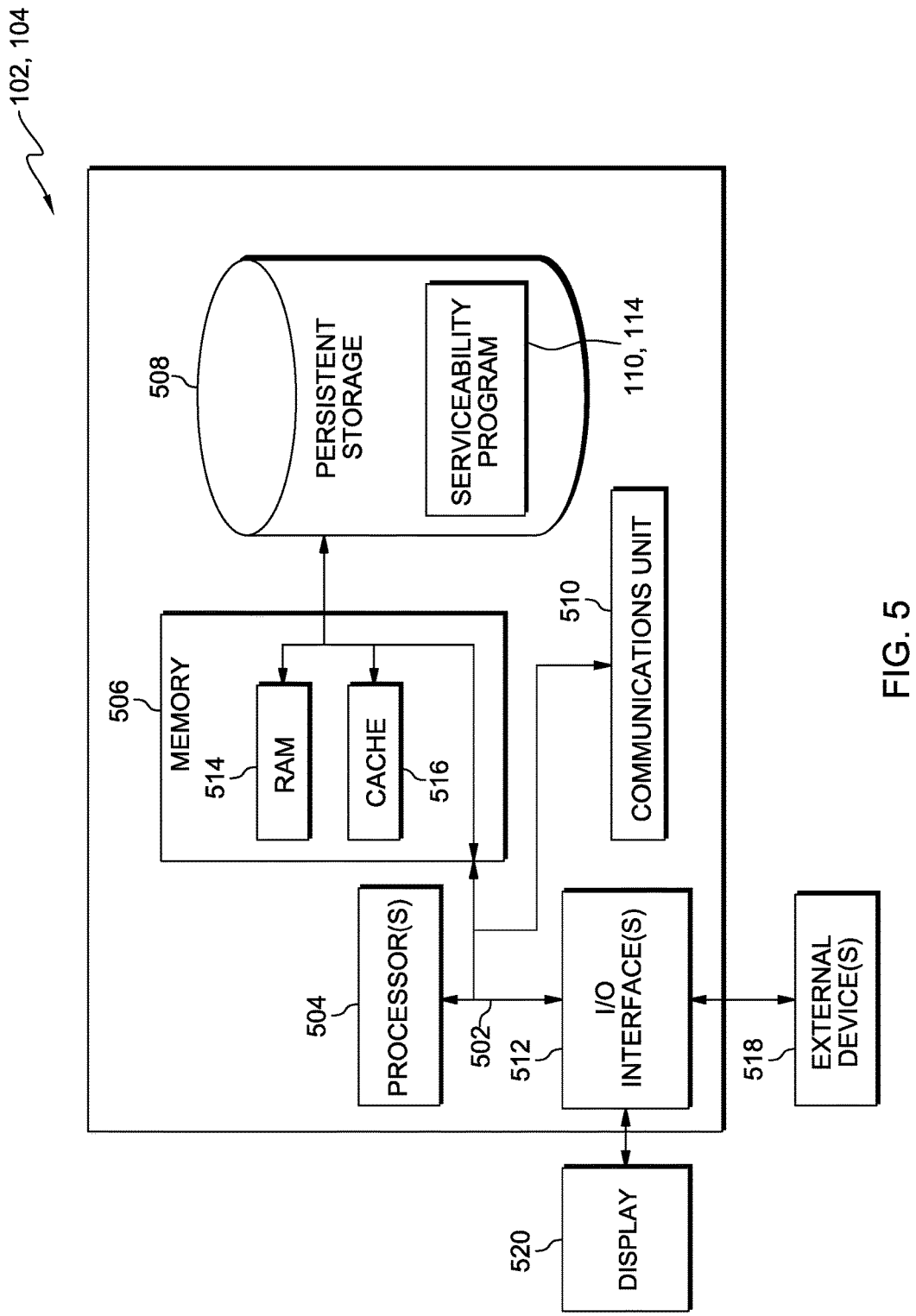
FIG. 5 is a block diagram of components of a computer system, such as the computer server of FIG. 1, in accordance with an embodiment of the present invention.

FIG. 5 depicts a block diagram of components of a computer, such as server computer 102 and electronic device 104, respectively hosting serviceability program 110 and serviceability program 114 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 102 and electronic device 104 include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage medium.

Serviceability program 110 and serviceability program 114 are stored in persistent storage 508 for execution by one or more of computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including systems and devices within or controlled by server computer 102 and electronic device 104. In these examples, communications unit 510 includes one or more wireless network interface cards. Communications unit 510 may provide communications through the use of either or both physical and wireless communications links. Computer programs and processes, such as serviceability program 110 and serviceability program 114, may be downloaded to persistent storage 508 through communications unit 510, or uploaded to another system through communications unit 510.

I/O interface(s) 512 allows for input and output of data with other devices that may be connected to server computer 102 and electronic device 104. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 508 via I/O interface(s) 512. I/O interface(s) 512 may also connect to a display 520. Display 520 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing serviceability modes in a data center, the method comprising:
    receiving, by one or more processors, a serviceability mode selection for a component in a data center, wherein the serviceability mode correlates to information presented by one or more components in the data center;
    assigning, by one or more processors, a scheme for one or more LEDs on the component based, at least in part, on the received serviceability mode selection;
    activating, by one or more processors, the one or more LEDs on the component based at least on the assigned scheme, wherein activating the one or more LEDs allows for information associated with the serviceability mode selection to be displayed on the component;
    receiving, by one or more processors, a video file of the activated one or more LEDs on the component based at least on the assigned scheme from a first electronic device, wherein the video file of the one or more LEDs includes information associated with the serviceability mode selection; and
    identifying, by one or more processors, information associated with the serviceability mode selection present in the video file of the activated one or more LEDs on the component based at least on the assigned scheme.

2. The method of claim 1, further comprising:
    sending, by one or more processors, the received serviceability mode to other components of the one or more components in the data center.

3. The method of claim 2, further comprising:
    receiving, by one or more processors, the serviceability mode selection for the component in the data center through a user interface.

4. The method of claim 3, wherein the serviceability mode selection of the data center through the user interface includes at least two or more serviceability modes.

5. The method of claim 1, further comprising:
    displaying, by one or more processors, the identified information in a user interface.

6. The method of claim 1, wherein the serviceability mode selection includes at least one of: identify and locate mode, repair and verify mode, environment monitor mode, and management tool mode.

7. A computer program product for managing serviceability modes in a data center, the computer program product comprising:
    one or more computer readable tangible storage media and program instructions stored on at least one of the one or more storage media, the program instructions comprising:
    program instructions to receive a serviceability mode selection for a component in a data center, wherein the serviceability mode correlates to information presented by one or more components in the data center;
    program instructions to assign a scheme for one or more LEDs on the component based, at least in part, on the received serviceability mode selection;
    program instructions to activate the one or more LEDs on the component based at least on the assigned scheme, wherein activating the one or more LEDs allows for information associated with the serviceability mode selection to be displayed on the component;
    program instructions to receive a video file of the activated one or more LEDs on the component based at least on the assigned scheme from a first electronic device, wherein the video file of the one or more LEDs includes information associated with the serviceability mode selection; and
    program instructions to identify information associated with the serviceability mode selection present in the video file of the activated one or more LEDs on the component based at least on the assigned scheme.

8. The computer program product of claim 7, further comprising program instructions, stored on the one or more computer readable storage media, which when executed by a processor, cause the processor to:
    send the received serviceability mode to other components of the one or more components in the data center.

9. The computer program product of claim 8, further comprising program instructions, stored on the one or more computer readable storage media, which when executed by a processor, cause the processor to:
    receive the serviceability mode selection for the component in the data center through a user interface.

10. The computer program product of claim 9, wherein the serviceability mode selection of the data center through the user interface includes at least two or more serviceability modes.

11. The computer program product of claim 7, further comprising program instructions, stored on the one or more computer readable storage media, which when executed by a processor, cause the processor to:
    display the identified information in a user interface.

12. The computer program product of claim 7, wherein the serviceability mode selection includes at least one of: identify and locate mode, repair and verify mode, environment monitor mode, and management tool mode.

13. A computer system for managing serviceability modes in a data center, the computer system comprising:
    one or more computer processors;

one or more computer readable storage media;
program instructions stored on the computer readable storage media for execution by at least one of the one or more computer processors, the program instructions comprising:
program instructions to receive a serviceability mode selection for a component in a data center, wherein the serviceability mode correlates to information presented by one or more components in the data center;
program instructions to assign a scheme for one or more LEDs on the component based, at least in part, on the received serviceability mode selection;
program instructions to activate the one or more LEDs on the component based at least on the assigned scheme, wherein activating the one or more LEDs allows for information associated with the serviceability mode selection to be displayed on the component;
program instructions to receive a video file of the activated one or more LEDs on the component based at least on the assigned scheme from a first electronic device, wherein the video file of the one or more LEDs includes information associated with the serviceability mode selection; and
program instructions to identify information associated with the serviceability mode selection present in the video file of the activated one or more LEDs on the component based at least on the assigned scheme.

14. The computer system of claim 13, further comprising program instructions, stored on the one or more computer readable storage media, which when executed by a processor, cause the processor to:
send the received serviceability mode to other components of the one or more components in the data center.

15. The computer system of claim 14, further comprising program instructions, stored on the one or more computer readable storage media, which when executed by a processor, cause the processor to:
receive the serviceability mode selection for the component in the data center through a user interface.

16. The computer system of claim 15, wherein the serviceability mode selection of the data center through the user interface includes at least two or more serviceability modes.

17. The computer system of claim 13, further comprising program instructions, stored on the one or more computer readable storage media, which when executed by a processor, cause the processor to:
display the identified information in a user interface.

18. The computer system of claim 13, wherein the serviceability mode selection includes at least one of: identify and locate mode, repair and verify mode, environment monitor mode, and management tool mode.

* * * * *